United States Patent
Wu

(10) Patent No.: US 12,099,760 B2
(45) Date of Patent: Sep. 24, 2024

(54) IMAGE-FORMING DEVICE, AND METHOD AND CONTROLLER FOR CONTROLLING IMAGE-FORMING DEVICE BASED ON ENVIRONMENTAL PARAMETER SENSORS

(71) Applicant: Zhuhai Pantum Electronics Co., Ltd., Zhuhai (CN)

(72) Inventor: Di Wu, Zhuhai (CN)

(73) Assignee: ZHUHAI PANTUM ELECTRONICS CO., LTD., Zhuhai (CN)

( * ) Notice: Subject to any disclaimer, the term of this patent is extended or adjusted under 35 U.S.C. 154(b) by 0 days.

(21) Appl. No.: 18/350,359

(22) Filed: Jul. 11, 2023

(65) Prior Publication Data
US 2024/0103779 A1    Mar. 28, 2024

(30) Foreign Application Priority Data
Sep. 23, 2022 (CN) .......................... 202211166852.9

(51) Int. Cl.
*G06F 3/12* (2006.01)
*G03G 21/20* (2006.01)

(52) U.S. Cl.
CPC .......... *G06F 3/121* (2013.01); *G03G 21/203* (2013.01); *G06F 3/1208* (2013.01); *G06F 3/1229* (2013.01)

(58) Field of Classification Search
None
See application file for complete search history.

(56) References Cited

U.S. PATENT DOCUMENTS

| | | | |
|---|---|---|---|
| 6,433,811 B1 * | 8/2002 | Kim | H04N 1/407 347/240 |
| 2001/0043815 A1 * | 11/2001 | Kitajima | G03G 21/203 399/44 |
| 2007/0160377 A1 * | 7/2007 | Sakuwa | G03G 15/0266 399/50 |
| 2014/0185096 A1 | 7/2014 | Tokunaga | |
| 2017/0075272 A1 * | 3/2017 | Kimura | G03G 15/5025 |
| 2017/0131663 A1 * | 5/2017 | Kikegawa | G03G 15/55 |
| 2018/0217546 A1 * | 8/2018 | Nagamatsu | G03G 15/80 |
| 2019/0227485 A1 * | 7/2019 | Hamasaki | G03G 21/1623 |
| 2019/0391530 A1 * | 12/2019 | Kishimoto | G03G 21/203 |
| 2023/0289107 A1 * | 9/2023 | Watanabe | G06F 3/1204 |

FOREIGN PATENT DOCUMENTS

| | | |
|---|---|---|
| JP | H10161469 A | 6/1998 |
| JP | 2009122444 A | 6/2009 |
| JP | 5953222 B2 | 7/2016 |

\* cited by examiner

*Primary Examiner* — Henok Shiferaw
(74) *Attorney, Agent, or Firm* — ANOVA LAW GROUP PLLC

(57) ABSTRACT

The present disclosure provides an image-forming device, and a method and a controller for controlling the image-forming device. The method is executed by the controller of the image-forming device. The method includes when a first sensor disposed in the image-forming device is abnormal, determining, by the controller, an environmental parameter in real-time through one or more target apparatuses disposed in the image-forming device, where the environmental parameter includes at least one of temperature and humidity; and the first sensor is configured to detect the environmental parameter inside the image-forming device; and according to the environmental parameter in real-time, adjusting, by the controller, a control parameter when the image-forming device forms images.

17 Claims, 4 Drawing Sheets

IMAGE-FORMING DEVICE, AND METHOD AND CONTROLLER FOR CONTROLLING IMAGE-FORMING DEVICE BASED ON ENVIRONMENTAL PARAMETER SENSORS

CROSS-REFERENCE TO RELATED APPLICATION

This application claims the priority to Chinese patent application No. 202211166852.9, filed on Sep. 23, 2022, the entirety of which is incorporated herein by reference.

TECHNICAL FIELD

The present disclosure generally relates to the field of image-forming device technology and, more particularly, relates to an image-forming device, and a method and a controller for controlling the image-forming device.

BACKGROUND

Image-forming devices are capable of printing images or text on imaging media, and include printers, copiers, fax machines, scanners, and multi-functional all-in-one machines that integrate printing, copying, faxing, scanning and other functions.

In existing technology, the image-forming device is disposed with a sensor for detecting internal environmental parameter. The environmental parameter includes at least one of temperature and humidity, and the sensor can send detected environmental parameter to the controller of the image-forming device. Therefore, the controller can adjust the control parameters when the image-forming device forms images according to the environmental parameter in real-time, thereby improving the quality of images formed by the image-forming device and user experience.

However, since only one sensor is disposed in the image-forming device, if the sensor is abnormal, the controller cannot accurately determine the environmental parameter inside the image-forming device, which may affect the quality of the images formed by the image-forming device and reduce user experience of the image-forming device.

SUMMARY

One aspect of the present disclosure provides a method for controlling an image-forming device, executed by a controller of the image-forming device. The method includes, when a first sensor disposed in the image-forming device is abnormal, determining, by the controller, an environmental parameter in real-time through one or more target apparatuses disposed in the image-forming device, where the environmental parameter includes at least one of temperature and humidity; and the first sensor is configured to detect the environmental parameter inside the image-forming device; and according to the environmental parameter in real-time, adjusting, by the controller, a control parameter when the image-forming device forms images.

Another aspect of the present disclosure provides an image-forming device. The image-forming device includes a processor and a memory which are communicatively connected to each other, where a computer program is stored in the memory, and when the computer program is executed, the processor is configured to: when a first sensor disposed in the image-forming device is abnormal, determine an environmental parameter in real-time through one or more target apparatuses disposed in the image-forming device, where the environmental parameter includes at least one of temperature and humidity; and the first sensor is configured to detect the environmental parameter inside the image-forming device; and further configured to, according to the environmental parameter in real-time, adjust a control parameter when the image-forming device forms images.

Another aspect of the present disclosure provides a controller. The controller includes a processor and a memory which are communicatively connected to each other, where a computer program is stored in the memory, and when the computer program is executed, the processor is configured to execute a method for controlling an image-forming device. The method includes when a first sensor disposed in the image-forming device is abnormal, determine an environmental parameter in real-time through one or more target apparatuses disposed in the image-forming device, where the environmental parameter includes at least one of temperature and humidity; and the first sensor is configured to detect the environmental parameter inside the image-forming device; and according to the environmental parameter in real-time, adjust a control parameter when the image-forming device forms images.

Another aspect of the present disclosure provides an electronic device. The electronic device includes a processor and a memory which are communicatively connected to each other, where a computer program is stored in the memory, and when the processor executes the computer program, the processor executes the disclosed methods.

Another aspect of the present disclosure provides a storage medium, where computer instructions are stored in the storage medium, and when the computer instructions are executed by a computer, the computer executes the disclosed methods.

Other aspects of the present disclosure may be understood by those skilled in the art in light of the description, the claims, and the drawings of the present disclosure.

BRIEF DESCRIPTION OF THE DRAWINGS

To clearly describe technical solutions of various embodiments of the present disclosure, the drawings, which need to be used for describing various embodiments, are described below. Obviously, the drawings in the following description are merely some embodiments of the present disclosure. For those skilled in the art, other drawings may be obtained in accordance with these drawings without creative efforts.

DETAILED DESCRIPTION

Technical solutions in embodiments of the present disclosure are clearly and completely described with reference to drawings in embodiments of the present disclosure. Apparently, described embodiments are only some of embodiments of the present disclosure, not all of embodiments of the present disclosure. Based on embodiments in the present disclosure, all other embodiments obtained by those skilled in the art without making creative efforts belong to the protection scope of the present disclosure.

The terms "first", "second", "third", "fourth" and the like (if any) in the specification and claims of the present disclosure and above drawings are configured to distinguish similar objects, and not necessarily configured to describe a specific sequence or sequence. It is to be understood that the data used are interchangeable under appropriate circumstances, such that embodiments of the present disclosure described herein, for example, can be practiced in sequences other than those illustrated or described herein. Furthermore, the terms "comprise", "include" and any variations thereof are intended to cover a non-exclusive inclusion. For example, a process, a method, a system, a product or device including a sequence of steps or elements may not be necessarily limited to the sequence of steps or elements expressly listed and may include other steps or elements not explicitly listed or inherent to the process, the method, the product or device.

The connection relationship described in the present disclosure refers to direct or indirect connection. For example, the connection between A and B can be a direct connection between A and B, or an indirect connection between A and B through one or more other electrical components. For example, A and C may be directly connected, and C and B may be directly connected, so that A and B may be connected through C. It can also be understood that "A is connected to B" described in the present disclosure may indicate that A and B may be directly connected, or A and B may be indirectly connected through one or more other electrical components.

Image-forming devices provided in the present disclosure may include printers, copiers, fax machines, scanners, and multi-functional all-in-one machines that integrate printing, copying, faxing, scanning and other functions.

Figure 1:
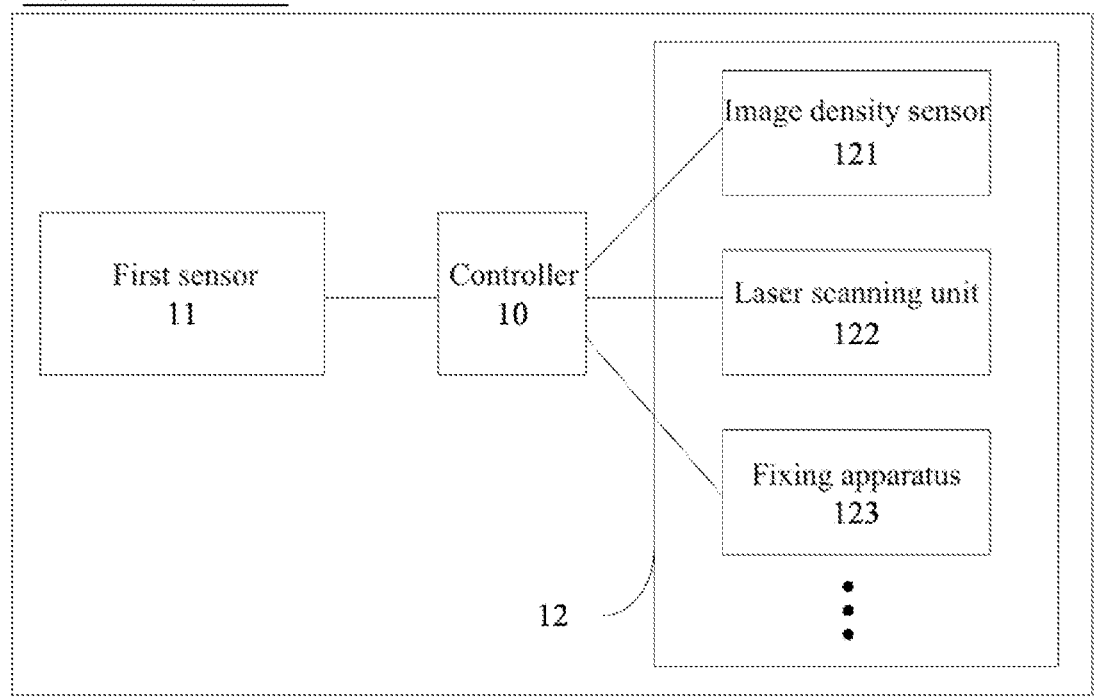
FIG. 1 illustrates a structural schematic of an image-forming device according to exemplary embodiments of the present disclosure.

FIG. 1 illustrates a structural schematic of an image-forming device according to exemplary embodiments of the present disclosure. The image-forming device 1 shown in FIG. 1 may include a controller 10, a first sensor 11 and at least one printing apparatus 12. At least one printing apparatus 12 may include an image density sensor 121, a laser scanning unit 122, a fixing apparatus 123, and the like.

The image density sensor 121 may also be called a counterpoint sensor (CTD), a color block sensor, a color block density sensor and the like, which may be configured to detect toner density, color block position, color block concentration and the like on the intermediate transfer belt (ITB) of the image-forming device 1.

The laser scanning unit 122 (LSU) may be configured to expose the photosensitive drum (image carrier) that has been uniformly charged, so that the surface charges of the photosensitive drum relative to the location of the original image may disappear. As a result, an image in the form of charges may be formed on the surface of the photosensitive drum.

The fixing apparatus 123 may be configured to fix the toner image formed on the image-forming medium on paper by heating and pressing.

The first sensor 11 may be disposed in the image-forming device 1 and configured to detect the environmental parameter in the image-forming device 1. In one embodiment, the environmental parameter may be at least one of temperature and humidity. The first sensor 11 may also be connected to the controller 10 and send detected environmental parameter to the controller 10.

The controller 10 may be a processor such as a central processing unit (CPU) or a microcontroller (MCU) in the image-forming device 1. After receiving the environmental parameter sent by the first sensor 11, the controller 10 may adjust the control parameter when the image-forming device 1 forms images according to the environmental parameter.

In one embodiment, the control parameters for the image-forming device 1 forming images may include a high voltage parameter, a fixing parameter, a light power parameter, and the like required by the printing apparatus 12 when the images are formed. The controller 10 may enable the printing apparatus 12 to form images in a more suitable way by adjusting the control parameters of the printing apparatus 12, thereby improving the image quality and user experience of the image-forming device 1.

However, only one sensor is disposed in the image-forming device 1 as shown in FIG. 1. Therefore during an application process of the image-forming device 1, when the first sensor 11 is abnormal, the controller 10 may not accurately determine the internal environmental parameter of the image-forming device 1, and the controller 10 may also not adjust the control parameters more effectively according to current environmental parameter in real-time, thereby further affecting the quality of the images formed by the image-forming device 1 and reducing user experience of the image-forming device 1. In some cases, if the first sensor 11 is abnormal, after-sales maintenance personnel of the image-forming device 1 may need to replace the first sensor 11 to ensure normal operation of next image formation. As a result, operation steps may be cumbersome, and abnormality may not be handled immediately.

Figure 2:
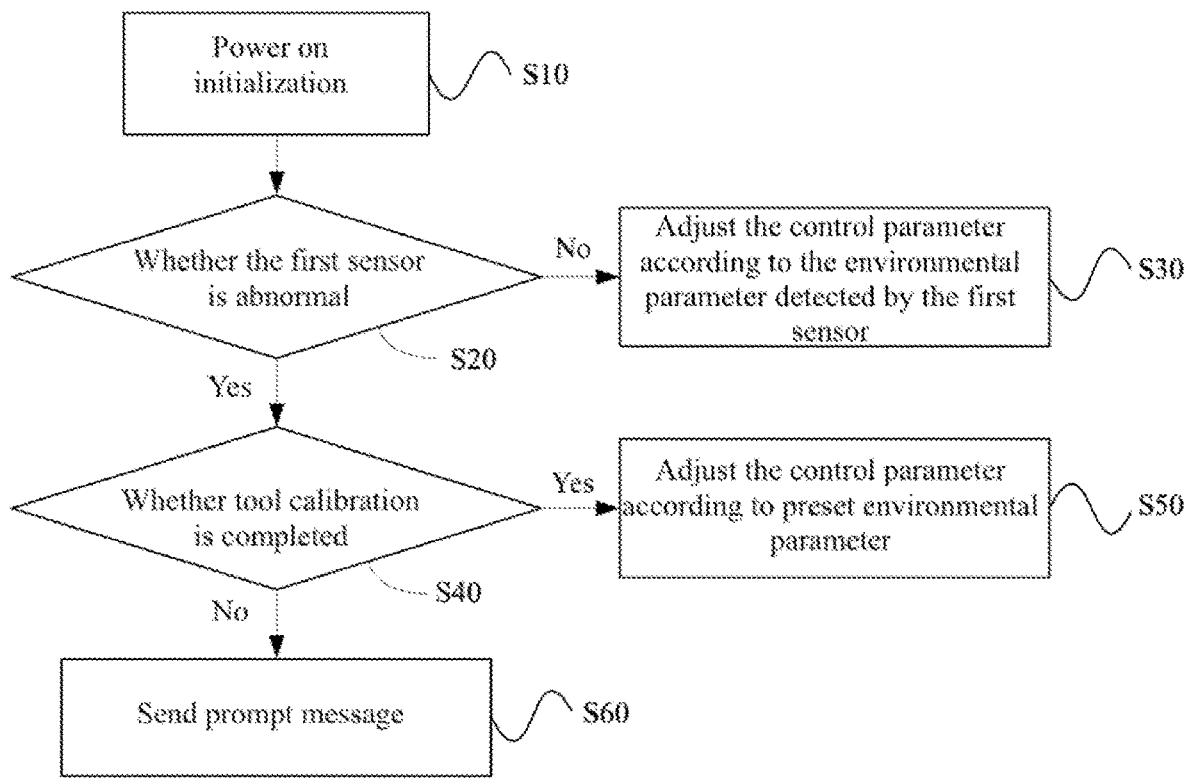
FIG. 2 illustrates a processing flowchart of an image-forming device when a first sensor is abnormal.

FIG. 2 illustrates a processing flowchart of the image-forming device when the first sensor is abnormal. FIG. 2 shows the processing flow of the controller 10 of the image-forming device 1 in FIG. 1. For example, in S10, the controller 10 may be powered on and initialized. Subsequently, in S20, the controller 10 may determine whether the first sensor 11 is abnormal. If it is determined that the first sensor 11 is normal, the controller 10 may receive the environmental parameter sent by the first sensor 11 and adjust the control parameter according to received environmental parameter. If it is determined that the first sensor 11 is abnormal, the controller 10 may further determine whether the image-forming device 1 has completed tool calibration through S40. If it is determined that the image-forming device 1 has completed tool calibration, the controller 10 may adjust the control parameters according to preset environmental parameter in S50. If it is determined that the image-forming device 1 has not completed tool calibration, the controller 10 may send a prompt message in S60, the prompt message may be configured to indicate that the first sensor 11 is abnormal and remind factory personnel to perform maintenance on the image-forming device 1. Tool calibration may be a special detection equipment configured to test and adjust sensor parameters. The preset environmental parameter may be specified or determined in advance, for example, may be stored in the controller 10.

However, in existing technology shown in FIG. 2, when the first sensor 11 is abnormal, although the controller 10 can use the preset environmental parameter to adjust the control parameter, the preset environmental parameter may not accurately represent the environmental parameter of the position that current image-forming device is located, and certain deviation may be between the preset environmental parameter and the environmental parameter. As a result, when the first sensor 11 is abnormal, the quality of the images formed by the image-forming device 1 may be low, which may reduce user experience of the image-forming device.

Therefore, aiming at above-mentioned problem in the existing technology in FIG. 2 that the quality of the images formed by the image-forming device 1 is low due to the abnormality of the first sensor 11, embodiments of the present disclosure further provide a method for controlling the image-forming device 1. When the first sensor 11 is abnormal, the controller 10 may determine environmental parameter in real-time according to other target apparatuses in the image-forming device 1 and solve problems in the existing technology based on the technical manner of using the environmental parameter in real-time to adjust the control parameter. In the image-forming device 1 provided by embodiments of the present disclosure, the controller 10 can still determine the environmental parameter more accurately when the first sensor 11 is abnormal, thereby overcoming the defects in the existing technology. The technical solutions of the present disclosure are described in detail below with various embodiments. The following embodiments may be combined with each other, and same or similar concepts or processes may not be described in detail in some embodiments.

Figure 3:
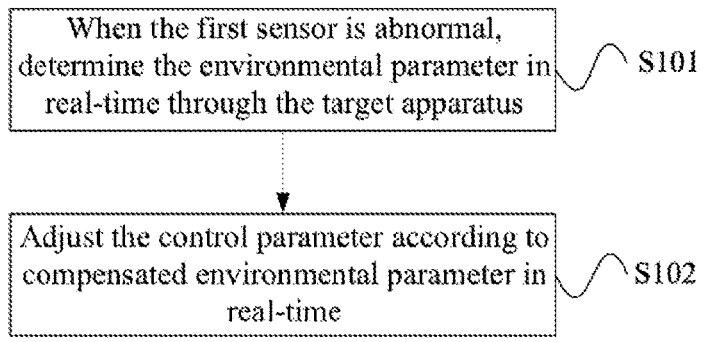
FIG. 3 illustrates a flowchart of a method for controlling an image-forming device according to exemplary embodiments of the present disclosure.

FIG. 3 illustrates a flowchart of the method for controlling the image-forming device according to exemplary embodiments of the present disclosure. The control method shown in FIG. 3 can be applied to the image-forming device 1 shown in FIG. 1 and executed by the controller 10. For example, the method for controlling the image-forming device as shown in FIG. 3 may include following exemplary steps.

In S101, when the first sensor 11 is abnormal, the controller 10 may determine the environmental parameter in real-time through the target apparatus disposed in the image-forming device 1.

The environmental parameter in real-time may include at least one of temperature and humidity. For example, the environmental parameter in real-time may include real-time temperature, which may be configured to indicate the temperature inside the image-forming device 1. For another example, the environmental parameter in real-time may include real-time humidity, which may be configured to indicate the humidity inside the image-forming device 1.

The first sensor 11 may be disposed inside the image-forming device 1 and configured to detect the environmental parameter in the image-forming device 1. The environmental parameter may include at least one of temperature and humidity. The first sensor 11 may send the environmental parameter to the controller 10 of the image-forming device 1, so that the controller 10 may adjust the control parameter of the image-forming device 1 according to the environmental parameter. In one embodiment, when the image-forming device 1 is a printer, the first sensor 11 may be disposed near the front door of the printer.

In one embodiment, the controller 10 may detect the first sensor 11 after the image-forming device 1 is powered on and obtain status information and the like of the first sensor 11 to determine whether the first sensor 11 is abnormal. For example, the environmental parameter detected by normal first sensor 11 should have a corresponding detection range, such that the controller 10 may determine that the first sensor 11 is abnormal through that the environmental parameter detected by the first sensor 11 exceeds the detection range. The controller 10 may complete adjustment of the control parameter during the powered-on phase of the image-forming device 1, such that the images formed by the image-forming device 1 after powered-on may be ensured to have high quality, thereby ensuring user experience.

Figure 4:
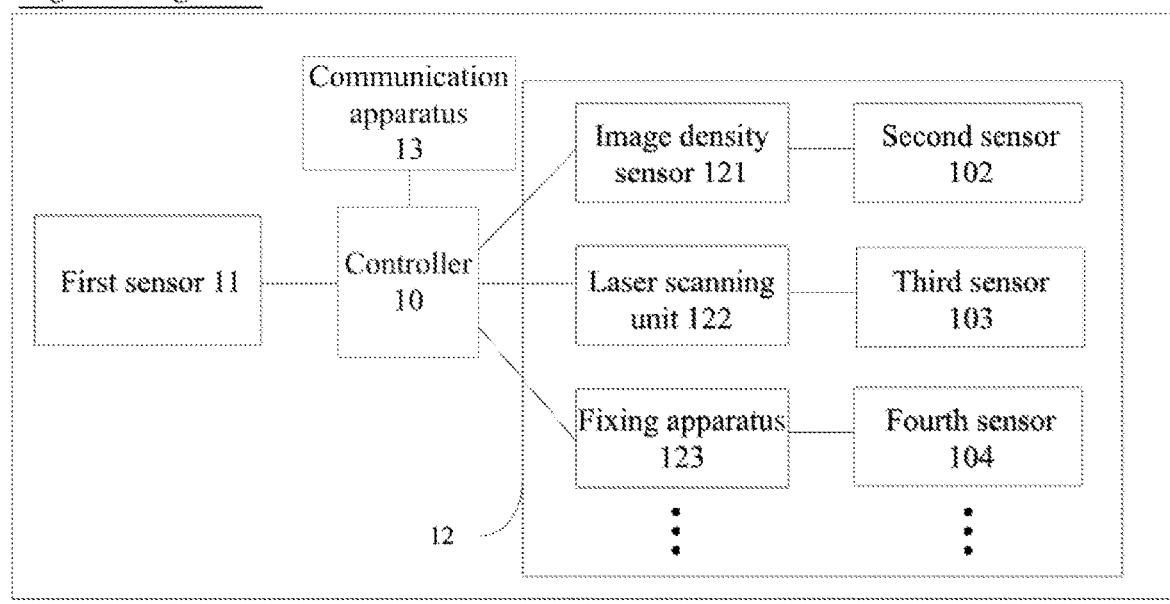
FIG. 4 illustrates another structural schematic of an image-forming device according to exemplary embodiments of the present disclosure.

FIG. 4 illustrates a structural schematic of the image-forming device according to exemplary embodiments of the present disclosure. As shown in FIG. 4, in one embodiment, the target apparatus may include at least one apparatus in a communication apparatus 13, a second sensor 102, a third sensor 103 and a fourth sensor 104. The second sensor 102, the third sensor 103 and the fourth sensor 104 may be configured to collect environmental parameters corresponding to respective locations. In one embodiment, the second sensor 102, the third sensor 103 and the fourth sensor 104 may collect environmental parameters when the image-forming device 1 is in a non-working cold state.

In one embodiment, the target apparatus may be an apparatus originally installed in the image-forming device 1, so that the controller 10 may determine the environmental parameter in real-time according to existing devices installed in the image-forming device 1. Therefore, the environmental parameter in real-time may be determined without changing internal structure of the image-forming device 1, so that one embodiment may have technical effects of simple implementation, easy use and popularization.

The communication apparatus 13 may be an apparatus with communication function such as a Wi-Fi communication apparatus, a WLAN communication apparatus, and the like. The communication apparatus 13 may be connected to the controller 10; and the controller 10 may communicate through the communication apparatus 13. In one embodiment, when the first sensor 11 of the image-forming device 1 is abnormal, the controller 10 may be connected to the Internet through the communication apparatus 13, obtain the weather forecast of the location of the image-forming device 1 from the Internet server, and then determine environmental parameter in the weather forecast and use the environmental parameter in the weather forecast as the environmental parameter in real-time. The controller 10 may determine the environmental parameter in real-time according to the weather forecast at the location of the image-forming device 1, obtained environmental parameter in real-time may be related to current location of the image-forming device 1, such that the environmental parameter in real-time may have relatively strong real-time and effectiveness.

The second sensor 102 may be a sensor disposed in the image density sensor 121 for detecting the environmental parameter in the image density sensor 121. When the first sensor 11 is normal, the image density sensor 121 may be configured to determine the environmental parameter through the second sensor 102. When the first sensor 11 is abnormal, since the image density sensor 121 can determine the environmental parameter through the second sensor 102, the controller 10 may obtain the environmental parameter determined by the second sensor 102 through the image density sensor 121 which may be configured as the environmental parameter in real-time. Or the second sensor 102 may be a sensor disposed outside the image density sensor 121. When the first sensor 11 is abnormal, the controller 10 may obtain the environmental parameter outside the image density sensor 121 determined by the second sensor 102, which may be configured as the environmental parameter in real-time.

The third sensor 103 may be a sensor provided in the laser scanning unit 122 for detecting the environmental parameter in the laser scanning unit 122. Therefore, when the first sensor 11 is normal, the laser scanning unit 122 may be configured to determine the environmental parameter through the third sensor 103. When the first sensor 11 is abnormal, since the laser scanning unit 122 can determine the environmental parameter through the third sensor 103, the controller 10 may obtain the environmental parameter determined by the third sensor 103 through the laser scanning unit 122, which may be configured as the environmental parameter in real-time. Or the third sensor 103 may be a sensor disposed outside the laser scanning unit 122. When the first sensor 11 is abnormal, the controller 10 may obtain the environmental parameter outside the laser scanning unit 122 determined by the third sensor 103, which may be configured as the environmental parameter in real-time.

The fourth sensor 104 may be a sensor in the fixing apparatus 123 for detecting the environmental parameter in the fixing apparatus 123. Therefore, when the first sensor 11 is normal, the fixing apparatus 123 may be configured to determine the environmental parameter through the fourth sensor 104. When the first sensor 11 is abnormal, since the fixing apparatus 123 can determine the environmental parameter through the fourth sensor 104, the controller 10 may obtain the environmental parameter determined by the fourth sensor 104 through the fixing apparatus 123, which may be configured as the environmental parameter in real-time. Or the fourth sensor 104 may be a sensor disposed outside the fixing apparatus 123. When the first sensor 11 is abnormal, the controller 10 may obtain the environmental parameter outside the fixing apparatus 123 determined by the fourth sensor 104, which may be configured as the environmental parameter in real-time.

In one embodiment, after the controller 10 determines the environmental parameter in real-time in S101, the controller 10 may also compensate the environmental parameter in real-time according to the preset environmental parameter; and next, in S102, the controller 10 may adjust the control parameter according to compensated environmental parameter in real-time to further improve the accuracy of obtained environmental parameter in real-time. The compensation manner may not be limited in embodiments of the present disclosure. For example, a specific error value may be between the weather forecast information and the first sensor 11, such that when the first sensor 1 is normal, the information obtained through the first sensor 11 and the weather forecast may be collected multiple times, and the error average value between the weather forecast information and the first sensor 11 may be determined. Subsequently, when the first sensor 11 is abnormal, after the controller 10 obtains the environmental parameter of the weather forecast as the environmental parameter in real-time through the communication apparatus 13, the environmental parameter in real-time may be compensated according to the average value. Therefore, compensated environmental parameter in real-time may be obtained for subsequent processing.

In S102, the controller 10 may adjust the control parameter when the image-forming device 1 forms images according to the environmental parameter in real-time determined in S101.

In one embodiment, when the environmental parameter in real-time includes temperature and humidity, the controller 10 may adjust the control parameter when the image-forming device 1 forms images according to the temperature and humidity in the environmental parameter in real-time. In embodiments of the present disclosure, the control parameter, values and specific adjustment manners for forming images may not be limited.

In one embodiment, when the environmental parameter in real-time includes temperature, the controller 10 may determine the humidity according to the preset environmental parameter, and then adjust the control parameter when the image-forming device 1 forms images according to the temperature in the environmental parameter in real-time and the humidity in the preset environmental parameter. When the environmental parameter in real-time obtained by the target apparatus are incomplete, the controller 10 may combine the preset environmental parameter to obtain complete environmental parameter in real-time, and then adjust the control parameter, such that the controller 10 may not be unable to adjust the control parameter due to lack of parameters, which may ensure completeness of the adjustment solution when the controller 10 adjusts the control parameter.

In another embodiment, when the environmental parameter in real-time includes humidity, the controller 10 may determine the temperature according to the preset environmental parameter. Furthermore, according to the humidity in the environmental parameter in real-time and the temperature in the preset environmental parameter, the control parameter may be adjusted when the image-forming device 1 forms images.

As disclosed above, in the method for controlling the image-forming device 1 provided in embodiments of the present disclosure, the controller 10 of the image-forming device 1 may use other target apparatuses in the image-forming device 1 to determine the environmental parameter in real-time when the first sensor 11 is abnormal and adjust the control parameter when the image-forming device forms images according to the environmental parameter in real-time. The controller 10 in embodiments of the present disclosure may determine the environmental parameter in real-time through the target apparatus inside a same image-forming device 1, such that the environmental parameter in real-time may better reflect actual environmental parameter of current image-forming device 1 than the preset environmental parameter with relatively high accuracy and reliability. Furthermore, the controller 10 may adjust the control parameter more accurately and effectively according to the environmental parameter in real-time. Therefore, the quality of the images formed by the image-forming device 1 according to adjusted control parameter may be higher, which may ultimately improve the user experience when the user uses the image-forming device 1 to form images.

Even when the first sensor 11 in the image-forming device 1 is abnormal, the quality of the images formed by the image-forming device 1 may be ensured as possible. On the premise of not increasing overall cost of the image-forming device 1, the functions of the image-forming device 1 may be enhanced by improving abnormality handling capability of the image-forming device 1.

Meanwhile, after the first sensor 11 in the image-forming device 1 is abnormal, it is also possible to ensure normal operation of next image formation without the need for after-sales maintenance personnel of the image-forming device 1 to replace the first sensor 11, which may also reduce operation steps when the image-forming device 1 is abnormal and improve timeliness of abnormality processing.

In one embodiment, the target apparatus may include any one of the communication apparatus 13, the second sensor 102, the third sensor 103 and the fourth sensor 104, such that the controller 10 may determine the environmental parameter in real-time through one such apparatus.

In one embodiment, the target apparatuses may include at least two apparatuses of the communication apparatus 13, the second sensor 102, the third sensor 103 and the fourth sensor 104, such that the controller 10 may obtain at least two corresponding environmental parameters according to at least two apparatuses, and the controller 10 may determine the environmental parameter in real-time according to at least two environmental parameters. Therefore, by more comprehensively considering the environmental parameters obtained by all apparatuses, the environmental parameter in real-time may be jointly obtained, thereby further improving the accuracy of obtained environmental parameter in real-time. For example, when the target apparatuses include the second sensor 102 and the third sensor 103, the controller 10 may determine an environmental parameter A corresponding to the image density sensor 121 through the second sensor 102 and determine an environmental parameter B corresponding to the laser scanning unit 122 through the third sensor 103. At this point, the controller 10 may weight the environmental parameter A and the environmental parameter B to obtain the environmental parameter in real-time. For example, the weight value corresponding to the environmental parameter A is 0.6, and the weight value corresponding to the environmental parameter B is 0.4, so that the weighted environmental parameter in real-time may be 0.6A+0.4B.

In one embodiment, the target apparatuses may include at least two apparatuses in the communication apparatus 13, the second sensor 102, the third sensor 103 and the fourth sensor 104, such that the controller 10 may determine the first apparatus from at least two apparatuses according to the detection priorities of at least two apparatuses to perform the operation of determining the environmental parameter, and the controller 10 may determine the environmental parameter in real-time according to the first apparatus. Since the controller 10 can select one apparatus from multiple apparatuses according to the detection priority to obtain the environmental parameter in real-time, the efficiency of determining the environmental parameter in real-time may be improved while ensuring accuracy.

In one embodiment, when the first apparatus 10 is normal, through the first apparatus, the controller 10 may obtain the environmental parameter determined by the first apparatus, and the controller 10 may use the environmental parameter determined by the first apparatus as the environmental parameter in real-time of target information. However, when the first apparatus 10 is abnormal, the controller 10 may, according to the detection priorities of at least two apparatuses, determine the second apparatus from at least two apparatuses to perform the operation of the environmental parameter, and the controller 10 may use the environmental parameter determined by the second apparatus as the environmental parameter in real-time. Since the controller 10 can sequentially select normal apparatuses according to the detection priority to determine the environmental parameter in real-time, the accuracy of obtained environmental parameter in real-time may be improved as possible on the basis of obtaining the environmental parameter in real-time.

In one embodiment, when at least two apparatuses are all abnormal and the controller 10 cannot determine the environmental parameter in real-time through at least two apparatuses, the controller 10 may determine the environmental parameter in real-time according to the preset environmental parameter and adjust the control parameter based on the environmental parameter in real-time. For example, the controller 10 may use the preset environmental parameter as the environmental parameter in real-time. Therefore, even if all target apparatuses in the image-forming device 1 cannot obtain the environmental parameter, the controller may still determine the environmental parameter in real-time according to the preset environmental parameter and then adjust the control parameter, which may ensure completeness of the adjustment solution when the controller adjusts the control parameter.

Figure 5:
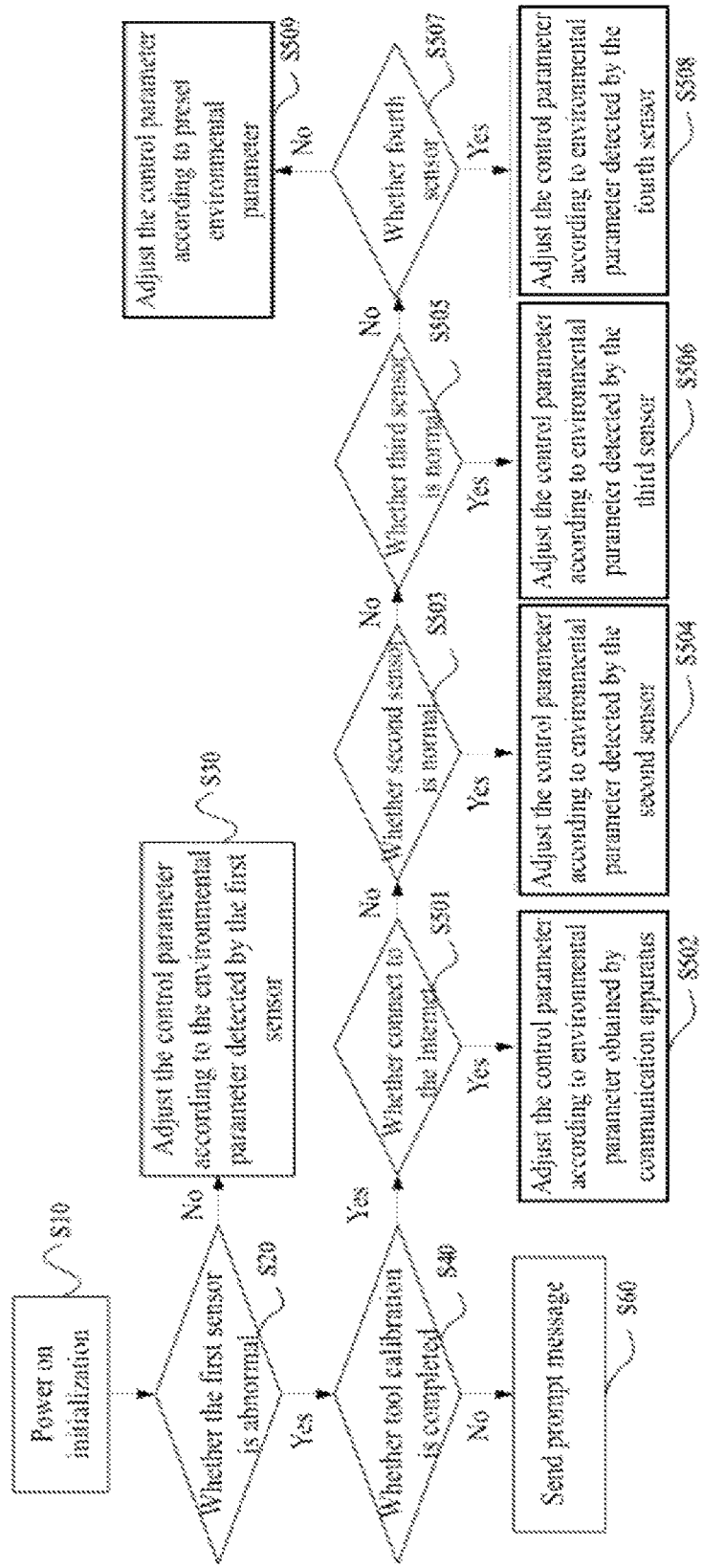
FIG. 5 illustrates another flowchart of a method for controlling an image-forming device according to exemplary embodiments of the present disclosure.

FIG. 5 illustrates another flowchart of the method for controlling the image-forming device according to exemplary embodiments of the present disclosure. The control method shown in FIG. 5 may be applied to the image-forming device 1 shown in FIG. 4 and executed by the controller 10. In S10, the controller 10 may be powered on and initialized. Subsequently, in S20, the controller 10 may determine whether the first sensor 11 is abnormal. If it is determined that the first sensor 11 is normal, the controller 10 may receive the environmental parameter sent by the first sensor 11 and use received environmental parameter as the environmental parameter in real-time, and then adjust the control parameter according to the environmental parameter in real-time. If it is determined that the first sensor 11 is abnormal, the controller 10 may further determine whether the image-forming device 1 has completed tool calibration through S40. If it is determined that the image-forming device 1 has not completed tool calibration, the controller 10 may send a prompt message in S60. If it is determined that the image-forming device 1 has completed tool calibration, the controller 10 may determine the environmental parameter in real-time and adjust the control parameter according to the priorities of different apparatuses in the target apparatuses through S501-S509.

In one embodiment shown in FIG. 5, according to the detection accuracy of the environmental parameter detected by the communication apparatus 13, the second sensor 102, the third sensor 103, and the fourth sensor 104 in the image-forming device 1 shown in FIG. 4, the target apparatuses may be arranged from high to low according to the priority of detection accuracy, that is, the priority order is the communication apparatus 13, the second sensor 102, the third sensor 103 and the fourth sensor 104. Or, in another embodiment, the target apparatuses may also be arranged from high to low according to the priority of detection order, that is, the priority order is the communication apparatus 13, the second sensor 102, the third sensor 103 and the fourth sensor 104.

Therefore, when the controller 10 determines in S40 that the image-forming device 1 has completed tool calibration, it is determined whether the controller 10 can be connected to the Internet through the communication apparatus 13 in S501. If the controller 10 can be connected to the Internet through the communication apparatus 13, then in S502, the controller 10 may use the environmental parameter obtained by the communication apparatus 13 as the environmental parameter in real-time and adjust the control parameter according to the environmental parameter in real-time. If the controller 10 cannot be connected to the Internet through the communication apparatus 13, it is determined whether the second sensor 102 is normal in S503. If the second sensor 102 is normal, then in S504, the controller 10 may use the environmental parameter obtained by the second sensor 102 as the environmental parameter in real-time and adjust the control parameter according to the environmental parameter in real-time. If the second sensor 102 is abnormal, it is determined whether the third sensor 103 is normal in S505. If the third sensor 103 is normal, then in S506, the controller 10 may use the environmental parameter obtained by the third sensor 103 as the environmental parameter in real-time and adjust the control parameter according to the environmental parameter in real-time. If the third sensor 103 is abnormal, it is determined whether the fourth sensor 104 is normal in S507. If the fourth sensor 104 is normal, then in S508, the controller 10 may use the environmental parameter obtained by the fourth sensor 104 as the environmental parameter in real-time and adjust the control parameter according to the environmental parameter in real-time. If the fourth sensor 104 is abnormal, then in S509, the controller 10 may adjust the control parameters according to the preset environmental parameter.

It should be noted that, as shown in FIG. 5, the priorities arranged from high to low according to the order of the communication apparatus 13, the second sensor 102, the third sensor 103 and the fourth sensor 104 may be only exemplary. The image-forming device 1 may also be configured with other priority orders, which may not be limited in embodiments of the present disclosure.

In above-mentioned embodiments, the method for controlling the image-forming device provided in embodiments of the present disclosure is introduced. In addition, in order to realize various functions in the method for controlling the image-forming device provided by the above-mentioned embodiments of the present disclosure, the controller as the execution subject may include a hardware structure and/or a software module and realize above-mentioned functions in the form of a hardware structure, a software module, or a hardware structure and a software module. Whether one of above-mentioned functions is executed in the form of a hardware structure, a software module, or a hardware structure and a software module may depend on specific application and design constraints of technical solutions.

For example, the present disclosure further provides an apparatus for controlling the image-forming device, including a determination module and an adjustment module. The determination module may be configured to determine target information through the target apparatus when the first sensor of the image-forming device is abnormal. The adjustment module may be configured to adjust the control parameter according to the target information.

Specific implementation and principle of the apparatus for controlling the image-forming device provided in the present disclosure may refer to the method for controlling the image-forming device in above-mentioned embodiments of the present disclosure. Specific implementation manners and principles may be same, which may not be described in detail.

It should be noted that it may be understood that division of each module of above-mentioned apparatus may be only a division of logical functions and may be fully or partially integrated into one physical entity or physically separated during actual implementation. In addition, these modules may all be implemented in the form of calling software through processing elements; may also be implemented in the form of hardware; or some modules may also be implemented in the form of calling software through processing elements, and some modules may be implemented in the form of hardware. Furthermore, the module may be used as a separate processing element integrated in a chip of above-mentioned apparatus. In addition, the module may also be stored in the memory of above-mentioned apparatus in the form of program code, which may be called and executed by a certain processing element of above-mentioned apparatus to execute the function of above-mentioned determination module. The implementation of other modules may be similar to above description. In addition, all or a part of these modules may be integrated together and may also be implemented independently. The processing element mentioned here may be an integrated circuit with signal processing capability. In an implementation process, each step or module of above-mentioned method may be completed by the integrated logic circuit of hardware in the processor element or the instruction in the form of software.

For example, above modules may be one or more integrated circuits, for example, one or more application specific integrated circuits (ASIC), or one or more digital signal processor (DSP), or one or more field programmable gate arrays (FPGA) and the like, which may be configured to implement above-mentioned method. For another example, when one of above modules is implemented in the form of calling program code by a processing element, the processing element may be a general-purpose processor, such as a central processing unit (CPU) or other processors that can call program code. For another example, such modules may be integrated together and implemented in the form of a system-on-a-chip (SOC).

All or a part of above-mentioned embodiments may be implemented by software, hardware, firmware, or any combination thereof. When being implemented using software, all or a part of above-mentioned embodiments may be implemented in the form of a computer program product. The computer program product may include one or more computer instructions. When the computer program instructions are loaded and executed on the computer, all or a part of the processes or functions may be generated according to embodiments of the present disclosure. The computer may be a general purpose computer, a special purpose computer, a computer network, or other programmable apparatuses. The computer instructions may be stored in a computer-readable storage medium or transmitted from one computer-readable storage medium to another computer-readable storage medium. For example, the computer instructions may be transmitted from one web site site, computer, server, or data center to another web site site, computer, server, or data center via a wired manner (e.g., coaxial cable, optical fiber, and digital subscriber line (DSL)) or a wireless manner (e.g., infrared, wireless, microwave and the like). The computer-readable storage medium may be any available medium that can be accessed by the computer, or a data storage device such as a server or a data center integrated with one or more available media. The available medium may be a magnetic medium (for example, a floppy disk, a hard disk, or a magnetic tape), an optical medium (for example, DVD), or a semiconductor medium (for example, a solid state disk (SSD)), and the like.

For example, embodiments of the present disclosure further provide an electronic device including a processor and a memory. A computer program may be stored in the memory, and when the processor executes the computer program, the processor may be configured to execute the method for controlling an image-forming device according to any one of above-mentioned embodiments of the present disclosure.

Embodiments of the present disclosure further provide a computer-readable storage medium. The computer-readable storage medium may store computer instructions; and when being executed, the computer instructions may be configured to execute the method for controlling the image-forming device according to any one of above-mentioned embodiments of the present disclosure.

Embodiments of the present disclosure further provide a chip for executing instructions. The chip may be configured for executing any one of the methods for controlling the image-forming device in the present disclosure as described above.

Embodiments of the present disclosure further provide a computer program product. The program product may include a computer program stored on a storage medium; at least one processor may read the computer program from the storage medium; and when at least one processor executes the computer program, the method for controlling an image-forming device as described above in the present disclosure may be implemented.

Those skilled in the art may understand that all or a part of exemplary steps for implementing above-mentioned method embodiments may be completed by program instructions and related hardware. Above-mentioned program may be stored in a computer-readable storage medium. When the program is executed, exemplary steps of above-mentioned method embodiments may be executed; and above-mentioned storage medium may include ROM, RAM, magnetic disk, optical disk, and other various media that can store program codes.

Finally, it should be noted that above-mentioned embodiments may merely be configured to illustrate technical solutions of the present disclosure, rather than to limit the present disclosure. Although the present disclosure has been described in detail with reference to above-mentioned embodiments, those skilled in the art should understand that technical solutions described in above-mentioned embodiments may be modified or some or all of technical features may be equivalently replaced. Furthermore, such modifications or replacements may not make the essence of corresponding technical solutions depart from the scope of technical solutions of embodiments of the present disclosure.

What is claimed is:

1. A method for controlling an image-forming device, executed by a controller of the image-forming device, the method comprising:
   when a first sensor disposed in the image-forming device is abnormal, determining, by the controller, an environmental parameter in real-time through one or more target apparatuses disposed in the image-forming device and including at least one of a communication apparatus, a second sensor, a third sensor, and a fourth sensor; and
   according to the environmental parameter in real-time, adjusting, by the controller, a control parameter when the image-forming device forms images;
   wherein the environmental parameter includes at least one of temperature and humidity;
   the first sensor is configured to detect the environment parameter inside the image-forming device;
   the second sensor is configured to detect the environmental parameter inside and/or outside an image density sensor of the image-forming device;
   the third sensor is configured to detect the environmental parameter inside and/or outside a laser scanning unit of the image-forming device; and
   the fourth sensor is configured to detect the environmental parameter inside and/or outside a fixing apparatus of the image-forming device.

2. The method according to claim 1, wherein determining the environmental parameter in real-time through the one or more target apparatuses disposed in the image-forming device includes:
   obtaining the environmental parameter in a weather forecast at a location of the image-forming device through the communication apparatus and using the environmental parameter obtained by the communication apparatus as the environmental parameter in real-time.

3. The method according to claim 1, wherein:
   the one or more target apparatuses include at least two apparatuses; and determining the environmental parameter in real-time through the one or more target apparatuses disposed in the image-forming device includes:
   obtaining at least two corresponding environmental parameters through the at least two apparatuses; and
   weighting the at least two environmental parameters to obtain the environmental parameter in real-time.

4. The method according to claim 1, wherein:
   the one or more target apparatuses include at least two apparatuses; and determining the environmental parameter in real-time through the one or more target apparatuses disposed in the image-forming device includes:
   according to detection priorities of the at least two apparatuses, determining a first apparatus from the at least two apparatuses, which is configured to determine the environmental parameter, wherein the detection priorities includes detection accuracy priorities or detection order priorities; and
   determining the environmental parameter in real-time through the first apparatus.

5. The method according to claim 4, wherein determining the environmental parameter in real-time through the first apparatus includes:
   when the first apparatus is normal, using the environmental parameter determined by the first apparatus as the environmental parameter in real-time; and
   when the first apparatus is abnormal, according to the detection priorities of the at least two apparatuses, determining a second apparatus from the at least two apparatuses, which is configured to determine the environmental parameter, and using the environmental parameter determined by the second apparatus as the environmental parameter in real-time.

6. The method according to claim 1, further including:
   if the environmental parameter in real time is unable to be determined through the one or more target apparatus, determining the environmental parameter in real-time according to a preset environmental parameter; and
   according to the environmental parameter in real-time, adjusting the control parameter when the image-forming device forms images.

7. The method according to claim 1, wherein if the environmental parameter include one of temperature and humidity, adjusting the control parameter when the image-forming device forms images according to the environmental parameter in real-time includes:
   according to one of temperature and humidity included in the environmental parameter and another one of temperature and humidity included in the preset environmental parameter, adjusting the control parameter when the image-forming device forms images.

8. The method according to claim 1, after determining the environmental parameter in real-time through the one or more target apparatus disposed in the image-forming device, further including:
   compensating the environmental parameter in real-time according to the preset environmental parameter.

9. The method according to claim 1, before determining the environmental parameter in real-time through the one or more target apparatus disposed in the image-forming device, further including:
   after the image-forming device is powered on, determining whether the first sensor is abnormal.

10. An image-forming device, comprising:
    a processor and a memory which are communicatively connected to each other, wherein a computer program is stored in the memory, and when the computer program is executed, the processor is configured to:

when a first sensor disposed in the image-forming device is abnormal, determine an environmental parameter in real-time through one or more target apparatuses disposed in the image-forming device and including at least one of a communication apparatus, a second sensor, a third sensor, and a fourth sensor; and according to the environmental parameter in real-time, adjust a control parameter when the image-forming device forms images;

wherein the environmental parameter includes at least one of temperature and humidity:

the first sensor is configured to detect the environmental parameter inside the image-forming device:

the second sensor is configured to detect the environmental parameter inside and/or outside an image density sensor of the image-forming device:

the third sensor is configured to detect the environmental parameter inside and/or outside a laser scanning unit of the image-forming device; and the fourth sensor is configured to detect the environmental parameter inside and/or outside a fixing apparatus of the image-forming device.

11. The device according to claim 10, wherein:
the processor is configured to obtain the environmental parameter in a weather forecast at a location of the image-forming device through the communication apparatus and use the environmental parameter obtained by the communication apparatus as the environmental parameter in real-time.

12. The device according to claim 10, wherein:
if the environmental parameter in real time is unable to be determined through the one or more target apparatus, the processor is further configured to determine the environmental parameter in real-time according to a preset environmental parameter; and according to the environmental parameter in real-time, adjust the control parameter when the image-forming device forms images.

13. A controller, comprising:
a processor and a memory which are communicatively connected to each other, wherein a computer program is stored in the memory, and when the computer program is executed, the processor is configured to execute a method for controlling an image-forming device, the method comprising:

when a first sensor disposed in the image-forming device is abnormal, determine an environmental parameter in real-time through one or more target apparatuses disposed in the image-forming device and including at least one of a communication apparatus, a second sensor, a third sensor, and a fourth sensor; and according to the environmental parameter in real-time, adjust a control parameter when the image-forming device forms images;

wherein: the environmental parameter includes at least one of temperature and humidity:

the first sensor is configured to detect the environmental parameter inside the image-forming device;

the second sensor is configured to detect the environmental parameter inside and/or outside an image density sensor of the image-forming device;

the third sensor is configured to detect the environmental parameter inside and/or outside a laser scanning unit of the image-forming device; and the fourth sensor is configured to detect the environmental parameter inside and/or outside a fixing apparatus of the image-forming device.

14. The controller according to claim 13, wherein determining the environmental parameter in real-time through the one or more target apparatuses disposed in the image-forming device includes:

obtaining the environmental parameter in a weather forecast at a location of the image-forming device through the communication apparatus and using the environmental parameter obtained by the communication apparatus as the environmental parameter in real-time.

15. The controller according to claim 13, wherein:
the one or more target apparatuses include at least two apparatuses; and determining the environmental parameter in real-time through the one or more target apparatuses disposed in the image-forming device includes:

obtaining at least two corresponding environmental parameters through the at least two apparatuses; and weighting the at least two environmental parameters to obtain the environmental parameter in real-time.

16. The controller according to claim 13, wherein:
the one or more target apparatuses include at least two apparatuses; and determining the environmental parameter in real-time through the one or more target apparatuses disposed in the image-forming device includes:

according to detection priorities of the at least two apparatuses, determining a first apparatus from the at least two apparatuses, which is configured to determine the environmental parameter, wherein the detection priorities include detection accuracy priorities or detection order priorities; and determining the environmental parameter in real-time through the first apparatus.

17. The controller according to claim 16, wherein determining the environmental parameter in real-time through the first apparatus includes:

when the first apparatus is normal, using the environmental parameter determined by the first apparatus as the environmental parameter in real-time; and when the first apparatus is abnormal, according to the detection priorities of the at least two apparatuses, determining a second apparatus from the at least two apparatuses, which is configured to determine the environmental parameter, and using the environmental parameter determined by the second apparatus as the environmental parameter in real-time.

* * * * *